(No Model.)
R. S. RINKER.
HOE.
No. 378,723. Patented Feb. 28, 1888.
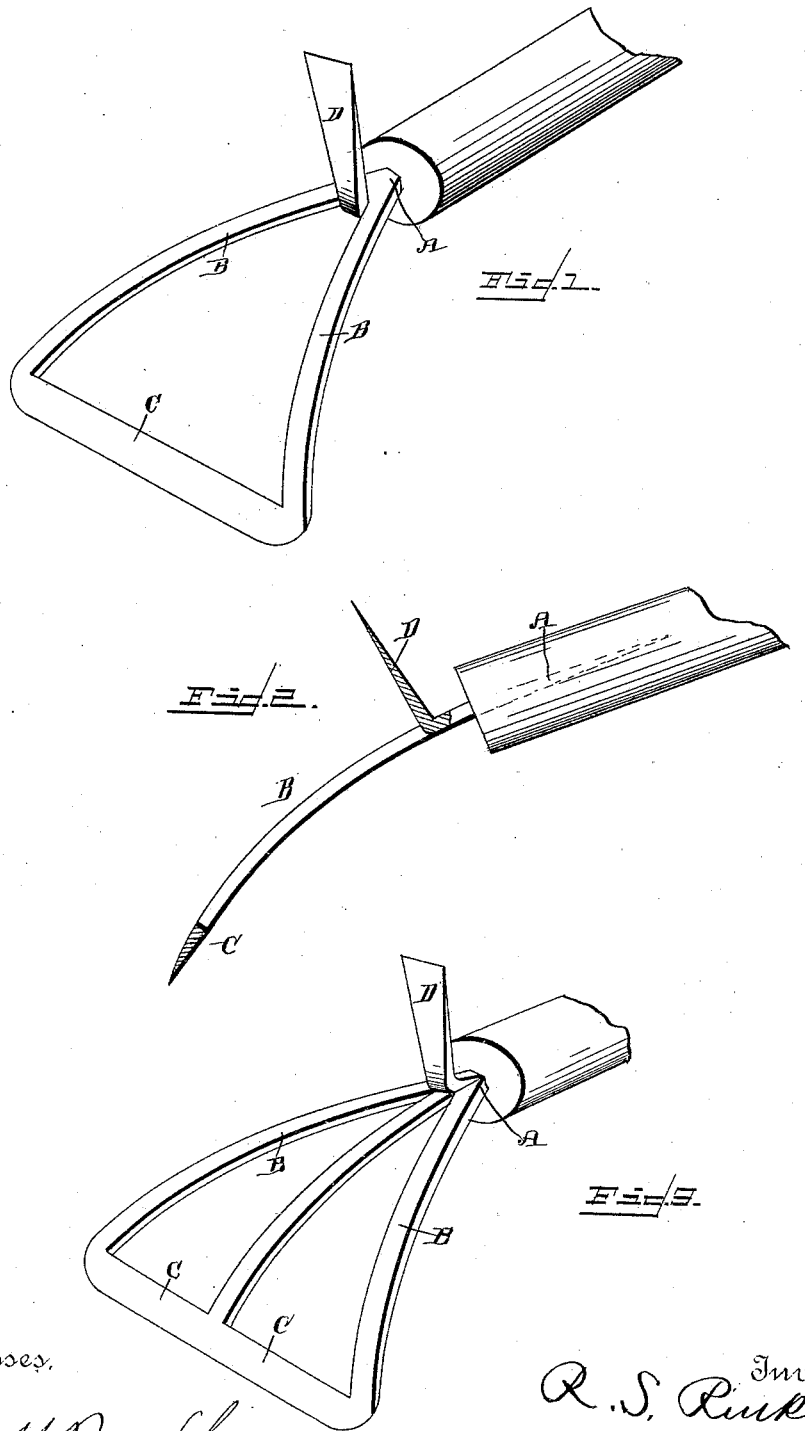

UNITED STATES PATENT OFFICE.

ROBERT SAMUEL RINKER, OF RINKERTON, VIRGINIA.

HOE.

SPECIFICATION forming part of Letters Patent No. 378,723, dated February 28, 1888.

Application filed July 26, 1887. Serial No. 245,370. (No model.)

*To all whom it may concern:*

Be it known that I, ROBERT SAMUEL RINKER, a citizen of the United States, residing at Rinkerton, in the county of Shenandoah and State of Virginia, have invented a new and useful Improvement in Hoes, of which the following is a specification.

My invention relates to a hoe for thinning out or rooting up plants between others, in order to give those which remain a better chance to thrive; and it consists in a certain novel construction, fully set forth hereinafter, and specifically pointed out in the claim.

In the accompanying drawings, Figure 1 is a perspective view of the hoe in the operative position. Fig. 2 is a central longitudinal section of the same. Fig. 3 is a view of a modified form of the hoe.

Referring by letter to the drawings, A designates the shank of the hoe, which is adapted to be inserted in the end of the handle, and B B represent two diverging arms branching from the lower end of the said shank and curved slightly downwardly at the outer ends.

C designates a narrow transverse blade connecting the ends of the diverging arms, and thus forming, in effect, a triangular blade having a narrow cutting-edge and an open interior.

D designates a small blade extending up from the upper side of the shank A at the rear ends of the diverging arms, and the said blade is adapted to serve as a planting or digging hoe, to form holes in which to place plants.

The said parts are preferably formed integral, and the operation of the tool is as follows: Place the edge of the narrow blade on the surface of the ground near the plant to be uprooted, and press on the same to cause it to pass down into the ground close to the root of the said plant. Now raise on the tool and throw the plant out, and the earth which was around the said plant will fall back into the hole from which the plant was taken through the space between the diverging arms and the narrow blade, thus leaving no opening in the ground. The tool being small and the blade narrow, the plants in the vicinity of the one which is removed will not be disturbed, except that the earth will be loosened slightly, which will only serve to cultivate the same, and thus encourage the growth of the said plants on each side.

It will be seen that by making the blade with an open central portion the earth which is around the plant removed is not carried away, but is allowed to drop back into the hole, as before mentioned, thus saving the refilling of holes formed by removing the plants.

Should it be desired for any reason to plant either seed or plants between others which are already in place, the hoe-blade D on the other side of the tool is adapted to serve the purpose of digging the holes. The said blade is also narrow, and will pass in between the plants in place, and a hole may be formed without disturbing the roots of the adjacent plants, or the said blade may be used to hill up small plants—that is, draw earth up around the roots thereof in the same manner as earth is drawn up around the roots of corn, except that with small plants it is necessary to be more delicate in the handling.

The said hoe-blade is designed to be formed of the material which is cut from between the arms B B of the hoe and turned up. Thus the said blade may be made of any desired width and sharpened at the upper edge to form a very serviceable hoe blade.

It will be understood that I do not limit myself strictly to the number of diverging arms B B which are used in the construction of my hoe, as there may be either two or more, (three being shown in the modification;) also, the hoe-blade D need not be formed of the material cut from the body of the hoe, but may be formed separate and either welded or secured in place at the end of the shank.

Having thus described my invention, I claim—

In a hoe, the combination, with the shank A, diverging arms B B at the free end thereof, and the transverse blade C at the extremities of the said arms, of the blade D, at an angle to the said shank and sharpened at the free edge, substantially as specified.

In testimony that I claim the foregoing as my own I have hereto affixed my signature in presence of two witnesses.

ROBERT SAMUEL RINKER.

Witnesses:
CHAS. A. R. MOORE,
R. F. CRAIG.